(12) United States Patent
Taege

(10) Patent No.: US 6,636,604 B1
(45) Date of Patent: Oct. 21, 2003

(54) METHOD AND DEVICE FOR SUPPRESSING ECHO IN A HANDS FREE DEVICE SUCH AS A TELEPHONE

(75) Inventor: Peter Taege, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/355,688

(22) PCT Filed: Oct. 28, 1998

(86) PCT No.: PCT/EP98/06840

§ 371 (c)(1),
(2), (4) Date: Oct. 4, 1999

(87) PCT Pub. No.: WO99/29093

PCT Pub. Date: Jun. 10, 1999

(30) Foreign Application Priority Data

Dec. 1, 1997 (DE) .......................................... 197 53 224

(51) Int. Cl.[7] ................................................ H04M 9/08
(52) U.S. Cl. ........................... 379/406.01; 379/406.02; 379/406.05; 379/406.06; 379/406.07; 379/406.08; 379/406.1
(58) Field of Search ........................ 379/406.01–406.16

(56) References Cited

U.S. PATENT DOCUMENTS 4,629,829 A * 12/1986 Puhl et al.
6,301,357 B1 * 10/2001 Romesburg

FOREIGN PATENT DOCUMENTS

| DE | 39 28 805 | 3/1991 |
|---|---|---|
| DE | 43 05 256 | 8/1994 |
| EP | 0 413 641 | 2/1991 |
| EP | 0413 641 A1 * | 2/1991 |
| EP | 0 415 031 | 3/1991 |
| EP | 0 471 083 | 2/1992 |
| EP | 0 739 123 | 10/1996 |

OTHER PUBLICATIONS

Der Fernmeldeingenieur, Jan. 1995, p. 32.
Der Fernmeldeingenieur, Oct. 1994, p. 11.

* cited by examiner

Primary Examiner—Forester W. Isen
Assistant Examiner—Ramnandan Singh
(74) Attorney, Agent, or Firm—Kenyon & Kenyon

(57) ABSTRACT

An method and a device for echo suppression in a handsfree apparatus, particularly for a telephone is disclosed. With the aid of a control unit, control signals are generated from the signal of the far-end subscriber, the output signal of the loudspeaker-room-microphone system and the output signal of an adaptive filter used as reference, the control signals having an amplitude and a time response dependent on the speech mode. Using the control signals, the amplifications $V_E$, $V_S$ of controllable amplifiers disposed in the receiving and transmitting paths are adapted to the speech mode, thus reducing the residual echo. The stepless transition of the amplifications from a quiescent value to a value attenuated with the factor and having an exponential time characteristic in response to a change of speech mode, provides an impression of natural speech.

15 Claims, 2 Drawing Sheets

METHOD AND DEVICE FOR SUPPRESSING ECHO IN A HANDS FREE DEVICE SUCH AS A TELEPHONE

The present invention relates to a device for echo suppression in a handsfree apparatus, particularly for a telephone.

BACKGROUND INFORMATION

Echo cancellers having adaptive filters for handsfree apparatuses are known in general, the cancellers altering the amplification of controllable amplifiers disposed in the transmitting and receiving paths of the handsfree apparatus in accordance with the speech activity of the near-end and far-end subscribers. In practice, the familiar room-echo cancellers achieve echo attenuations of between 20 dB and 30 dB. Consequently, owing to for example, an adaptive filter length which is too short, imprecise adjustment because of existing noise, or nonlinearities, there remains a residual echo.

To reduce the residual echo, German Patent No. 41 19 936 proposes a nonlinear filter which can also be considered as a further development of the center clipper (see "Der Fernmeldeingenieur", 1/95, p. 32). The disadvantages of this arrangement, however, lie in the nonlinearity of the filter, which results in signal distortion at low levels.

A further possibility for reducing the residual echo is the use of the level balance proposed, for example, in German Patent No. 43 05 256, German Patent No. 39 28 805, European Patent No. 0 415 031 and also described in "Der Fernmeldeingenieur", 10/94, p. 11. In this case, controllable amplifiers are located in the transmitting and receiving paths, respectively. Starting from a quiescent value, the amplifications of the amplifiers are changed in opposite directions, such that the product of the amplifications remains constant. Although the level balance prevents nonlinearities, a disadvantage lies in the fact that, in the quiescent state or during two-way speech, an attenuation is effective in both directions equivalent to half the deviation of the level balance.

European Patent No. 0 471 083, describes a handsfree apparatus having echo cancellers and additional adjustable amplifiers. To control the amplifiers, the received signal and the transmitted signal are evaluated in a control circuit and the amplifiers are switched over between two amplifications.

This arrangement has the disadvantage that the transmitted signal rises in response to parameter changes, and simulates an activity of the near-end subscriber. Although the control circuit was not explained in detail in the patent specification, it can be assumed that the product of both amplifications is kept constant. Consequently, this is a form of level balance in which a high attenuation is set in the receiving path and a low attenuation is set in the transmitting path when the near-end subscriber is speaking. If the far-end subscriber is speaking, the relationships are reversed.

Some disadvantages of this arrangement lie in the fact that, when the near-end subscriber is speaking, he can easily gain the impression that he has a bad connection and, in the case of two-way speech, disturbances arise due to the changeover of the amplification.

SUMMARY OF THE INVENTION

On the object of the present invention is to provide an improvement in the room-echo cancellation of handsfree apparatuses, particularly during two-way speech. An algorithm is made available for adjusting the amplification of the two, amplifiers in the transmitting and receiving paths, such that a large additional attenuation is attained for the residual echo without disturbing the impression of natural speech. At the same time, an intention is to prevent erroneous decisions by the control logic due to parameter changes.

An objective is achieved according to the present invention by a device for echo suppression in a handsfree apparatus, particularly for a telephone, the device having an adaptive filter, a control circuit, as well as adjustable amplifiers disposed in the transmitting and receiving paths, the amplification of the amplifiers being controlled by the control circuit with control signals $V_{in}$, $V_{out}$, the control circuit including a first short-term power estimator which emits a signal $P_f$ at its output as a measure for the power of the received signal $U_f$ from the far-end subscriber. Also provided in the control circuit are one or more further power estimators whose output signals, either individually or in combination, form a measure $P_n$ for the power of the near-end subscriber. The variables $P_n$ and $P_f$ are used to form a first control variable $U_1 = P_n + P_f$, as well as a second control variable $U_2 = P_n/P_f$. A control logic processes control variables $U_1$, $U_2$ according to the following rules to form output signals $V\tau$, $V_1$ and $V_2$, wherein $S_0$ and $S_1$ are predetermined threshold values, $S_1 < 1$ and $\alpha$, $\beta < 1$:

if $U_1 < S_0$, then $V\tau = 0$, $V_1 = 1$ and $V_2 = \beta$;

if $U_1 > S_0$ and $U_2 < S_1$, then $V\tau = 0$, $V_1 = \alpha$ and $V_2 = 1$;

if $U_1 > S_0$ and $U_2 > 1/S_1$, then $V\tau = 1$, $V_1 = 1$ and $V_2 = \beta$;

if $U_1 > S_0$ and $1/S_1 > U_2 > S_1$, then $V\tau = 1$, $V_1 = 1$ and $V_2 = 1$.

Signals $V_1$ and $V_2$ are supplied in each case to a nonlinear shaping filter allocated to the transmitting and receiving paths of the handsfree apparatus, the output signals $V_{out}$ and $V_{in}$ of the shaping filters controlling the amplification of the respective amplifier in proportion to their magnitude, and the control signal $V\tau$, depending on its level, setting two different time constants $\tau_0$, $\tau_1$ of the shaping filter in the transmitting path.

With regard to the method, an objective of the present invention is achieved by a method for echo suppression in a handsfree apparatus with a receiving path, including at least of one controllable amplifier and a loudspeaker, and with a transmitting path composed at least of one controllable amplifier and a microphone, the amplifications $V_S$ and $V_E$ respectively, of the controllable amplifiers in the transmitting and receiving paths being adapted to the speech activity of the far-end or near-end subscriber and, in order to determine the speech activity of the far-end subscriber, the power $P_f$ of the received signal $U_f$ being determined by a power estimator, the method being characterized by the following features:

a) the speech activity of the near-end subscriber is determined by one or more further power estimators whose output signals, either individually or in combination, represent a measure $P_n$ for the power of the near-end subscriber;

b) starting from the quiescent values $V_S = 1$ and $V_E = \beta$, the amplification of the controllable amplifiers is adjusted when the summation signal $U_1 = P_n + P_f$ exceeds a predetermined noise threshold $S_0$;

c) if the far-end subscriber is speaking, amplification $V_S$ in the transmitting path is set instantaneously to the value $\alpha < 1$ and amplification $V_E$ in the receiving path is set instantaneously to the value 1;

d) if the near-end subscriber is speaking, amplification $V_S$ in the transmitting path is set to the value 1 and amplification $V_E$ in the receiving path is set to the value $\beta < 1$, the transitions proceeding exponentially with the time constant $\tau_1$ in the transmitting path and with a time constant independent thereof in the receiving path;

e) if both subscribers are speaking, amplifications $V_S$ and $V_E$ are equal to 1, the transition in the receiving path being made instantaneously and the transition in the transmitting path being made exponentially with the time constant $\tau_1$;

f) if neither subscriber is speaking, amplification $V_S$ is set to the value 1 and amplification $V_E$ is set to the value $\beta$, the transitions proceeding exponentially with the time constant $\tau_0 > \tau_1$ in the transmitting path and with a time constant independent thereof in the receiving path.

The amplifications of the controllable amplifiers are adjusted for echo cancellation according to the different speech modes when the summation signal $U_1 = P_n + P_f$ exceeds a predetermined noise threshold $S_0$, the speech modes "one-way speech" by the far-end or near-end subscriber and "two-way speech" being distinguished with the assistance of control variable $U_2 = P_n/P_f$ and a predetermined threshold value $S_1 < 1$. In this context, $U_2 < S_1$ corresponds to speaking by the far-end subscriber, $U_2 > 1/S_1$ corresponds to speaking by the near-end subscriber and $1/S_1 > U_2 > S_1$ applies to two-way speech.

Signal $P_n$ as a measure for the speech activity of the near-end subscriber is obtained, for example, in the following manner: The device contains a second power estimator which emits a signal $P_{LRM}$ at its output as a measure for the power of output signal $U_{LRM}$ of the loudspeaker-room-microphone system (LRM system), and a third power estimator which is connected to the output of the adaptive filter (model) $U_M$ and whose output signal $P_M$ is a measure for the power thereof. The adaptive filter is used as a reference and is intended to simulate the pure characteristics of the room. The difference of variables $P_{LRM}$ and $P_M$ is formed by a subtraction step, the output signal $P_n = P_{LRM} - P_M$ of the subtraction step then being a measure for the speech activity of the near-end subscriber. Furthermore, suitable logic elements form control variables $U_1$ and $U_2$ from variables $P_n$ and $P_f$.

The further development of the control device is based on the realization that the principle of the level balance must be abandoned if, on one hand, there is to be an impression of natural speech and if, on the other hand, there is to be a large additional attenuation of the residual echo of the echo canceller.

If only the far-end subscriber is active, an attenuation is switched into the transmitting path. At the same time, the amplification in the receiving path is set to 1. If both the near-end and the far-end subscribers are active, then the amplifications in the transmitting and receiving paths are set to 1. If only the near-end subscriber is active, then the amplification in the transmitting path is set to 1, while an attenuation is set in the receiving path.

In the transmitting path, a required attenuation is set instantaneously, while the transition to the amplification of 1 is carried out according to an exponential function with a defined time constant.

In the receiving path, the transition to an attenuation is carried out according to an exponential function and the rise to the amplification of 1 is carried out instantaneously.

Through this form of control, the signals of both subscribers are transmitted without attenuation during two-way speech. This provides an impression of natural speech. The attenuation in the transmitting path can be adjusted independently thereof, resulting in the desired additional suppression of the residual echo.

If there is additionally a noise source in the room of one of the subscribers, then the change in amplification controlled by the speech of the second subscriber may result in the subscriber being left with an unpleasant impression. In such a case, it may be advantageous to control the minimum amplification as a function of the level of the ambient noise in such a way that it rises as there is an increase in the sum of the weighted noise levels from both rooms.

Since the magnitude of the residual echo of the echo canceller depends on the room characteristics and increases, for example, in the case of rooms with strong reverberation, it may be advantageous, in such a case, in such a case to reduce the minimum amplification. The amplification may also be automatically adjusted to the conditions.

A measure of the speech power of the near-end subscriber may be obtained in a conventional manner with the assistance of a power estimator from the adaptation error e.

If greater parameter changes are to be expected in the LRM system, an advantageous embodiment of the present invention provides that a measure for the speech power of the near-end subscriber is obtained as the difference between the output powers of the model and the LRM system, so that the dependence on parameter changes in the LRM system is reduced. The difference should approximate the speech power of the near-end subscriber as well as possible. This is best achieved by square-law rectification.

In the case of greater ambient noise, its power is evaluated as speech activity. In order to prevent this, a measure for the speech power is formed as the difference between an upper power characteristic corresponding approximately to the sum of speech power and noise power, and a lower power characteristic approximately representing a measure for the noise power.

Despite optimization of the time constants of the amplifiers, in the case of two-way speech, it may happen that if the power of the near-end subscriber drops briefly, the control unit will set an attenuation in the amplifier in the transmitting path. To prevent this, an advantageous further development of the present invention provides for bridging such drops in power by a timing element. Whenever two-way speech has been detected, the timing element is started and retains output variables $V_1$, $V_2$ and $V_\tau$ of the control logic constant at the values for two-way speech for a defined delay time, e.g., 0.3 sec., even if the instantaneous control variables correspond to one-way speech. The input variables of the control logic are not evaluated again until after this time has expired.

DETAILED DESCRIPTION

Figure 1:
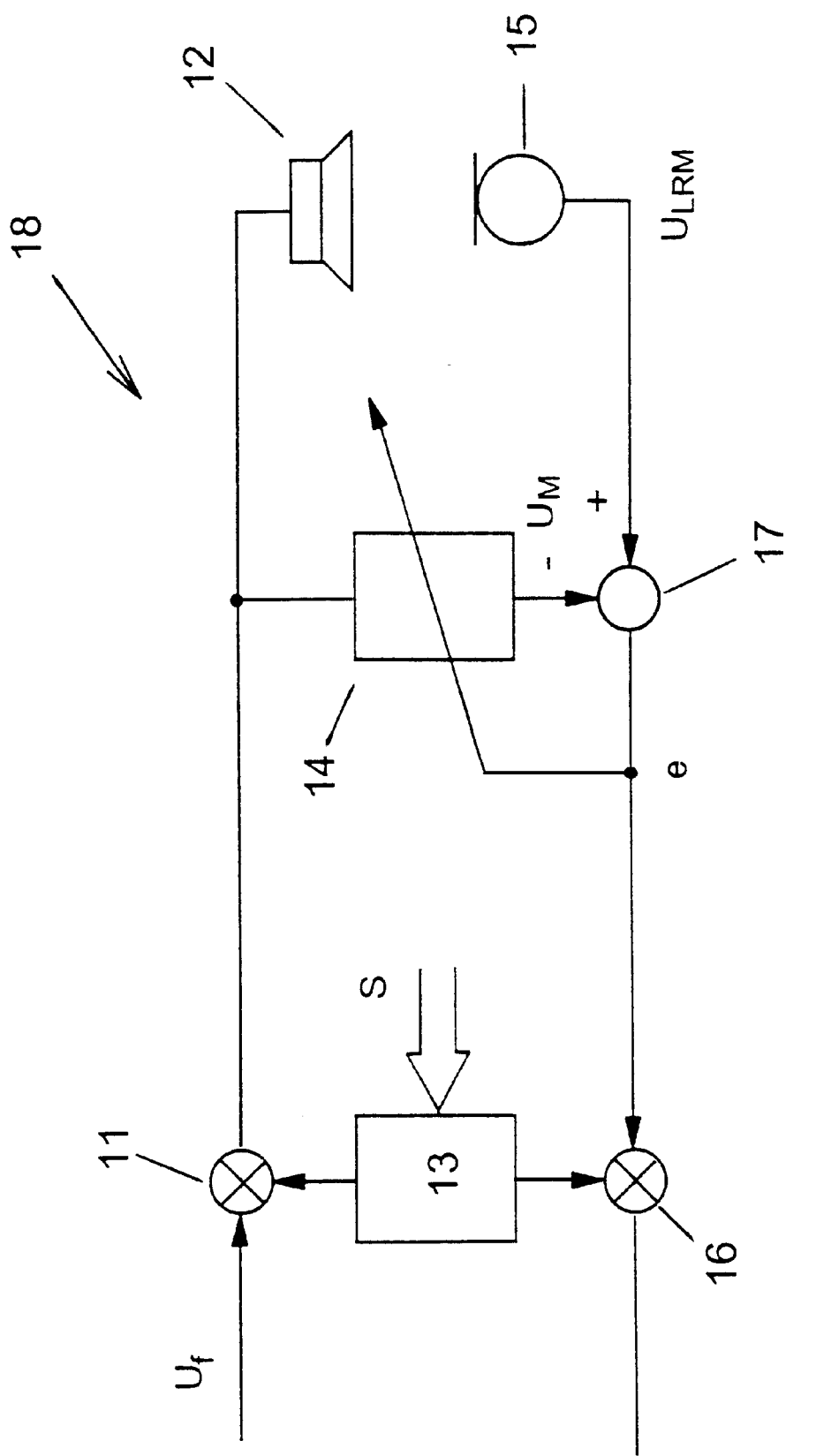
FIG. 1 shows a handsfree apparatus according to the present invention with a controllable amplifier in the transmitting path and in the receiving path, respectively.

FIG. 1 shows a handsfree apparatus 18 in which the signal of far-end subscriber $U_f$ is carried to loudspeaker 12 via an amplifier 11. The signal is additionally passed to adaptive filter 14 which, ideally, is so adjusted by the adaptation that it fully simulates the characteristics of the LRM system including loudspeaker 12, the room and microphone 15, and can therefore be used as a reference for determining the actual speech activity of the near-end subscriber.

In practice, however, it is not normally possible to establish a precise model of the LRM system. Therefore, after the output signal of model $U_M$ has been subtracted from output $U_{LRM}$ by adder 17, there remains, even after adaptation, a residual error e which is to be further reduced by adjustable amplifiers 11, 16 in conjunction with control unit 13.

Figure 2:
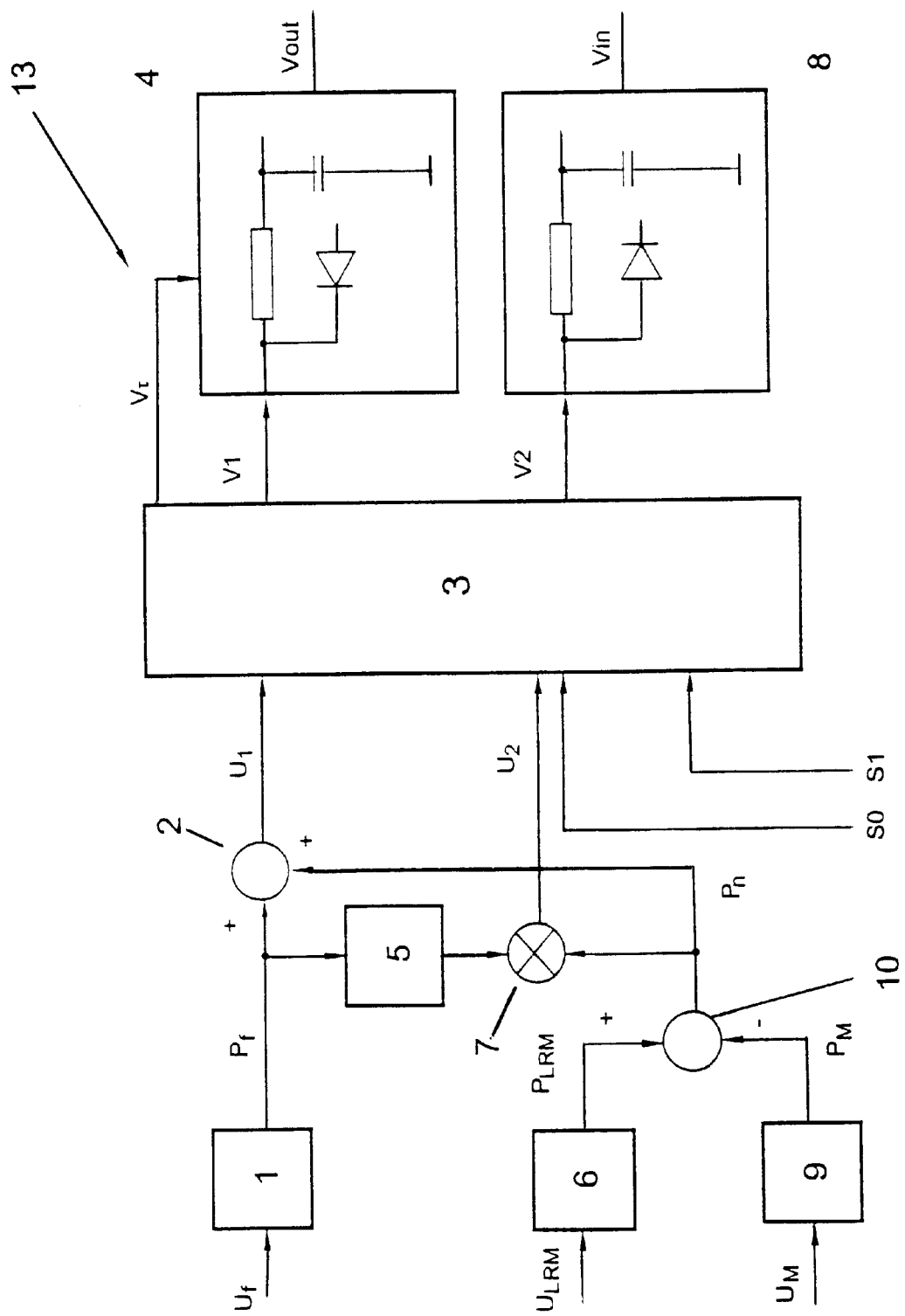
FIG. 2 shows a control unit according to the present invention for obtaining control signals from input signals to adjust the amplifications of the controllable amplifiers.

FIG. 2 shows a specific embodiment of control unit 13 according to the present invention.

Signal $U_f$ from the far-end subscriber is passed to a first short-term power estimator 1 whose output signal $P_f$ represents a measure for the speech activity of the far-end subscriber. A measure for speech activity $P_n$ of the near-end subscriber is obtained in that, using two further power estimators 6, 9, the short-term powers $P_M$ and $P_{LRM}$ of signals $U_M$ at the output of the model, i.e., of the adaptive filter 14, and $U_{LRM}$ at the output of the LRM system are estimated, their difference $P_n$ then being formed by subtractor 10.

At this point, variables $P_f$ and $P_n$ are used to obtain control signals $U_1$, $U_2$, where $U_1=P_f+P_n$ and $U_2=P_n/P_f$. In order to determine $U_1$, the outputs of power estimator 1 and of subtractor 10 are added in an adder 2. In order to determine $U_2$, the reciprocal value of variable $P_f$ is formed in a logic element 5 and is multiplied by variable $P_n$ in a multiplier 7. Control signals $U_1$, $U_2$ are processed in a decision logic 3 according to the following rules to form output signals $V\tau$, $V_1$ and $V_2$, wherein $S_0$ and $S_1$ are predetermined threshold values, $S_1<1$ and $\alpha$, $\beta<1$:

if $U_1<S_0$, then $V\tau=0$, $V_1=1$ and $V_2=\beta$;
if $U_1>S_0$ and $U_2<S_1$, then $V\tau=0$, $V_1=\alpha$ and $V_2=1$;
if $U_1>S_0$ and $U_2>1/S_1$, then $V\tau=1$, $V_1=1$ and $V_2=\beta$;
if $U_1>S_0$ and $1/S_1>U_2>S_1$, then $V\tau=1$, $V_1=1$ and $V_2=1$.

Depending on its level, control signal $V\tau$ sets two different time constants $\tau_0, \tau_1$ of shaping filter 4 in the transmitting path, where $\tau_0>\tau_1$.

In the first state where $U_1<S_0$, the levels of the received and output signals are below predetermined noise threshold $S_0$, with the consequence that there is no speech activity on the side of either the far-end or the near-end subscriber. Therefore, the signals do not need to be evaluated with a view to adjusting the amplifications in the transmitting and receiving paths. Threshold value $S_0$ ensures that evaluation does not begin until the signals are significantly above the background noise.

The formation of the quotient in conjunction with threshold $S_1$ ensures that two-way speech is still detected even if there is a difference between the two levels. According to the present invention, the three output signals $V\tau$, $V_1$ and $V_2$ of decision logic 3 control two nonlinear shaping filters 4 and 8, respectively, which are allocated to the transmitting and receiving paths of the handsfree apparatus and which determine the time characteristic of control signals $V_{out}$ and $V_{in}$ for controllable amplifiers 16 and 11.

Shaping filter 4, which delivers control signal $V_{out}$ for amplifier 16 in the transmitting path, is in the form of a minimum estimator, such that it immediately follows reductions of the input signal, whereas it follows with a delay in the case of an increase of the input signal.

Shaping filter 8 for control signal $V_{in}$ of amplifier 11 in the receiving path, in the manner of a maximum estimator, transmits an increase of the input signal quickly but follows a reduction with a delay.

Gaining a measure for the speech activity of the near-end subscriber represents a particular problem. It is customary to use the power of adaptation error e for this purpose. However, the adaptation error rises in response to parameter changes, and then simulates speech activity of the near-end subscriber. This deficiency is largely rectified by the use according to the present invention of the difference of the powers of model output $P_M$ and the output of the LRM system $P_{LRM}$. In order to ensure that the power of the near-end subscriber is not invalidated by the echo signal at the output of the LRM system, it is advisable to provide squaring elements in the power estimators.

In order to reduce the influence of an approximately constant ambient noise, it may be advantageous to provide a noise exemption by subtracting a minimum value, roughly equivalent to the power of the ambient noise, from a maximum value of the power.

Nevertheless, variable $P_n$ still contains components resulting from the signal of far-end subscriber $U_f$. Through the formation according to the invention of the quotient of the two measures of activity in conjunction with a suitably selected threshold $S_1$, incorrect decisions can largely be prevented. In FIG. 2, the quotient $U_2=P_n/P_f$ is formed. It is readily apparent that, given suitable changes of the comparison values in the decision logic, it is possible to use the reciprocal value to that instead.

In many cases, the formation of a quotient or a reciprocal value represents a problem. In control unit 13, the variable $U_2$ generated by quotient formation is compared to predetermined control values; for example, the unbalanced equation $U_2<S_1$ is tested. With $U_2=P_n/P_f$, there results $P_n/P_f<S_1$ or $P_n<S_1*P_f$. The formation of a quotient can therefore also be replaced by a simple multiplication with a fixed variable $S_1$.

LIST OF REFERENCE SYMBOLS 1,6,9 Power estimators
2,10,17 Adders/subtractors
3 Control unit
4,8 Shaping filters
5 Reciprocal-value former
7 Multiplier
11,16 Controllable amplifiers
12 Loudspeaker
13 Control unit
14 Adaptive filter
15 Microphone
$U_f$ Signal from far-end subscriber
$U_{LRM}$ Output signal of loudspeaker-room-microphone system
$U_M$ Output signal of model
$U_1$ Control signal
$U_2$ Control signal
$V\tau$ Output signal of decision logic
$V_1$ Output signal of decision logic
$V_2$ Output signal of decision logic
$V_{out}$ Output signal of shaping filter
$V_{in}$ Output signal of shaping filter
$V_E$ Amplification in receiving path
$V_S$ Amplification in transmitting path
$S_0$ Threshold value (noise)
$S_1$ Threshold value (accepted difference of level for two-way speech)
e Compensation error
S control signals
$\alpha$, $\beta$ Attenuations
$\tau_0, \tau_1$ Time constants of shaping filter in transmitting path

What is claimed is:
1. A device for echo suppression in a handsfree apparatus, comprising:
an adaptive filter;
a first adjustable amplifier associated with a receiving path of the handsfree apparatus,
a second adjustable amplifier associated with a transmitting path of the handsfree apparatus; and a control unit including a first short-term power estimator, at least one further short-term power estimator, a control logic unit, a first nonlinear shaping filter and a second nonlinear shaping filter, the control unit outputting a first control signal and a second control signal, the first short-term power estimator outputting a signal for measuring a power of a far-end subscriber signal, each output of the at least one further short-term power estimator at least one of forming individually and forming in combination a signal for measuring a power of a near-end subscriber signal, wherein the control logic unit has inputs including a first control variable $U_1$, a second control variable $U_2$, a first predetermined threshold value $S_0$ and a second predetermined threshold value $S_1$, the control logic unit having outputs including a first output signal $V\tau$, a second output signal $V_1$ and a third output signal $V_2$, wherein the first nonlinear shaping filter is associated with the transmitting path, the first nonlinear shaping filter being supplied with the second output signal $V_1$, the first nonlinear shaping filter outputting the second control signal, wherein the second nonlinear shaping filter is associated with the receiving path, the second nonlinear shaping filter being supplied with the third output signal $V_2$, the second nonlinear shaping filter outputting the first control signal, wherein the first control variable $U_1$ is a sum of the signal for measuring the power of the near-end subscriber signal and the signal for measuring the power of the far-end subscriber signal, wherein the second control variable $U_2$ is a quotient of the signal for measuring the power of the near-end subscriber signal and the signal for measuring the power of the far-end subscriber signal, wherein the control logic unit processes the first control variable $U_1$ and the second control variable $U_2$ to form the first output signal $V_\tau$, the second output signal $V_1$ and the third output signal $V_2$ according to rules below where the second predetermined threshold value $S_1$, a first factor $\alpha$ and a second factor $\beta$ are each less than one:
a) if $U_1<S_0$ then $V_\tau=0$, $V_1=1$ and $V_2=\beta$,
b) if $U_1>S_0$ and $U_2<S_1$ then $V_\tau=0$, $V_1=\alpha$ and $V_2=1$,
c) if $U_1>S_0$ and $U_2>1/S_1$ then $V_\tau=1$, $V_1=1$ and $V_2=\beta$, and
d) if $U_1>S_0$ and $1/S_1>U_2>S_1$ then $V_\tau=1$, $V_1=1$ and $V_2=1$, wherein the first control signal controls an amplification of the first adjustable amplifier in proportion to a magnitude of the first control signal, wherein the second control signal controls an amplification of the second adjustable amplifier in proportion to a magnitude of the second control signal, and wherein the first output signal $V_\tau$ sets at least one of a first time constant and a second time constant of the first nonlinear shaping filter as a function of at least a level of the first output signal $V_\tau$.

2. The device according to claim 1, wherein the device is used for a telephone.

3. The device according to claim 1, wherein the signal for measuring the power of the near-end subscriber signal is obtained directly from an adaptation error with the assistance of the at least one further short-term power estimator.

4. The device according to claim 1, wherein the at least one further short-term power estimator includes a second power estimator and a third power estimator, the second power estimator outputting a signal for measuring a power of a signal from a loudspeaker-microphone-room system, the third power estimator being coupled to an output of the adaptive filter and outputting a signal for measuring a power of a signal from the adaptive filter, a substractor forming a difference between the signal for measuring the power of the signal from the loudspeaker-microphone-room system and the signal for measuring the power of the signal from the adaptive filter, the difference being an estimated value for the power of the near-end subscriber signal.

5. The device according to claim 1, wherein the first nonlinear shaping filter is a minimum estimator and wherein the second nonlinear shaping filter is a maximum estimator.

6. The device according to claim 1, wherein the first time constant is greater than the second time constant.

7. The device according to claim 1, wherein at least one of the first factor $\alpha$ and the second factor $\beta$ is changed as a function of at least one of a room parameter and a noise voltage.

8. The device according to claim 1, wherein at least one of the far-end subscriber signal, an output signal from the adaptive filter, a signal from a loudspeaker-microphone-room system, an adaptive error signal is squared and then averaged in at least one of the first short-term power estimator and the at least one further short-term power estimator in order to determine at least one of the signal for measuring the power of the far-end subscriber signal, a signal for measuring a power of the output signal from the adaptive filter, a signal for measuring a power of the signal from the loudspeaker-microphone-room system and a signal for measuring a power of the adaptive error signal.

9. The device according to claim 1, wherein at least one of the first short-term power estimator and the at least one further short-term power estimator forms a value, the value being exempt from ambient noise by subtracting a lower power characteristic from an upper power characteristic.

10. The device according to claim 1,
wherein the control logic unit includes a timing element, the timing element, whenever $U_1>S_0$ and $1/S_1>U_2>S_1$, starting a timing of a preselected time delay and then changing a binary output of the timing element from 0 to 1,
wherein, after the timing of the preselected time delay, the timing element returns to an original state, and
wherein, as long as the binary output is 1, then $V_\tau=1$, $V_1=1$ and $V_2=1$.

11. A method for echo suppression in a handsfree apparatus, comprising the steps of:
adapting a first amplification $V_S$ of a first controllable amplifier associated with a receiving path of the handsfree apparatus and a second amplificaiton $V_E$ of a second controllable amplifier associated with a transmitting path of the handsfree apparatus to a far-end subscriber speech activity and a near-end subscriber speech activity, the receiving path including the first controllable amplifier and a loudspeaker, the transmitting path including the second controllable amplifier and a microphone;
determining the far-end subscriber speech activity by determining a signal for measuring a power of a received signal via a first power estimator;
determining the near-end subscriber speech activity by determining a signal for measuring a power of a near-end subscriber signal via at least one further power estimator;

adjusting values of $V_S$ and $V_E$ when a summation signal including a sum of the signal for measuring the power of the received signal and the signal for measuring the power of the near-end subscriber signal exceeds a predetermined noise threshold, where $V_S$ and $V_E$ start from quiescent values $V_S$ equal to 1 and $V_E$ equal to a value β;

if the far-end subscriber speech activity is present, then setting instantaneously $V_S$ to α and $V_E$ to 1, where α is a value less than one;

if the near-end subscriber speech activity is present, then transitioning $V_S$ to 1 exponentially with a second time constant and transitioning $V_E$ to β exponentially with a further time constant, wherein β is less than one and wherein the further time constant is independent of the second time constant;

if the far-end subscriber speech activity and the near-end subscriber speech activity are both present, then transitioning $V_S$ to 1 exponentially with the second time constant and transitioning $V_E$ to 1 instantaneously; and if the far-end subscriber speech activity and the near-end subscriber speech activity are not present, then transitioning $V_S$ to 1 exponentially with a first time constant, the first time constant being greater than the second time constant, and transitioning $V_E$ to β exponentially with the further time constant, the further time constant being independent of the first time constant.

12. The method according to claim 11, further comprising the step of:

distinguishing between two-way speech activity and at least one of one-way far-end subscriber speech activity and one-way near-end subscriber speech activity by comparing a control variable with a predetermined threshold value, the control variable being a quotient of the signal for measuring the power of the near-end subscriber signal and the signal for measuring the power of the received signal, the predetermined threshold value being less than one, wherein the control variable being less than the predetermined threshold value corresponds with the far-end subscriber speech activity being present, wherein the control variable being greater than a reciprocal of the predetermined threshold value corresponds with the near-end subscriber speech activity being present, and wherein the control variable being greater than the predetermined threshold and being less than the reciprocal of the predetermined threshold value corresponds to two-way speech activity.

13. The method according to claim 11, wherein determining the signal for measuring the power of the near-end subscriber signal includes the step of subtracting a signal proportional to a power of an output from an adaptive filter from a signal proportional to a power of an output signal from a loudspeaker-microphone-room system.

14. The method according to claim 11, wherein determining the signal for measuring the power of the near-end subscriber signal includes the step of directly obtaining the signal for measuring the power of the near-end subscriber signal from an adaptation error with aid of the at least one further power estimator.

15. The method according to claim 11, further comprising the step of:

determining at least one of the signal for measuring the power of the far-end subscriber signal, a signal for measuring a power of the output signal from an adaptive filter, a signal for measuring a power of the signal from a loudspeaker-microphone-room system and a signal for measuring a power of an adaptive error signal by squaring and then averaging in at least one of the first power estimator and the at least one further power estimator at least one of a far-end subscriber signal, an output signal from the adaptive filter, a signal from the loudspeaker-microphone-room system and an adaptive error signal.

* * * * *